INVENTOR.
WILBERT O. GIPP

INVENTOR.
WILBERT O. GIPP.

INVENTOR.
WILBERT O. GIPP.

United States Patent Office 3,438,672
Patented Apr. 15, 1969

3,438,672
ISOLATED PLATFORM MOUNTING
Wilbert O. Gipp, Racine, Wis., assignor to J. I. Case Company, Racine, Wis., a corporation of Wisconsin
Filed Oct. 12, 1967, Ser. No. 674,866
Int. Cl. B62d 23/00, 39/00
U.S. Cl. 296—35                                    4 Claims

ABSTRACT OF THE DISCLOSURE

A platform assembly for a tractor having an operator's station resiliently supported and unitarily removable from the tractor. The assembly includes yieldable connections between the platform and the tractor such that the operator's station and controls are isolated from the rigid tractor frame.

Background of the invention

In the operation of a motor vehicle, such as a truck or tractor, there are present certain tendencies and conditions which are not noticeable in an automobile. Of course, an auto is generally used for pleasure and is not subjected to pulling heavy loads. Also, tractors have vibrations set up by the engine and rough terrain, and the vibrations are transmitted to the frame and to the operator's station. The auto manufacturers have eliminated much of the engine vibration by providing resilient mountings on the auto frame and this, along with improved shock absorbers and springs, have smoothed the ride.

The prior art shows the use of resilient or cushioned seats on tractors, some of which have shock absorber type suspension systems and others which have rubber elements or springs to smooth the ride. Additionally, the prior art shows foot rest platforms which are resiliently mounted to diminish distortion and vibration. The prior art also shows the concept of attaching wheel fenders to the operator's platform, that of combining a tool cabinet with the platform, and that of combining the seat, fenders and tool box.

While much of this prior art has been directed toward operator convenience and comfort, the vibration problem has not been completely solved for the tractor operator. Of course, the four and six cylinder engines inherently provide for smoother engine operation than that of the larger engines, but there is still some vibration noticeable in the driver's seat. Improvements are therefore desirable to isolate completely the operator's station from the tractor frame.

Summary of the invention

The present invention relates to the concept of resiliently mounting the operator's station on the tractor frame and at the same time providing structure which is completely isolated and unitarily removable from the frame. As stated above, there are certain elements on tractors and they are secured to an operator's platform to provide enclosures for tools, batteries, and the like. These, however, have been rigidly secured to the tractor and accomplish the respective functions for which they were intended.

This invention provides that an operator's station, including all of the elements or devices that the operator handles or comes in contact with, are resiliently supported and removable from the tractor frame. These elements or devices include the seat structure, the steering wheel, the wheel fenders, the implement controls, the instrument console and firewall with the tractor controls, and the operator's platform. Although some of these elements, such as the fenders, are rigidly secured to the platform, the platform is wholly isolated from the tractor. The seat standard or support normally is rigidly secured to the platform, however, the seat suspension usually provides a resilient ride. The steering wheel, with which the operator is in continuous contact, is also isolated from the frame. The operator often places one hand on one or the other fender, and, since the fenders are not secured to the tractor frame, the engine vibration is not felt by the operator. The controls are also isolated from the frame in that linkages and connections are used at various points which allow some deflection as the tractor frame moves in relation to the platform.

Another feature, in addition to providing an isolated operator's station, is the ability to remove the station as a unit. This feature is accomplished by reason of resiliently mounting the operator's station as a unit, and this is also an advantage when performing maintenance on the rear end of the tractor.

Other features and advantages will become apparent from a reading of the following description taken together with the annexed drawings, in which.

Figure 1:
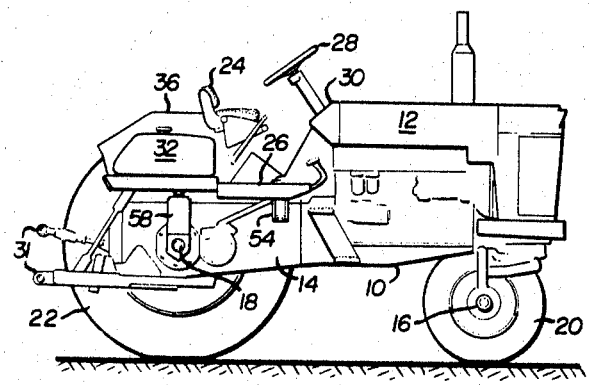
FIGURE 1 is a side elevational view of a tractor embodying the invention.
Figure 2:
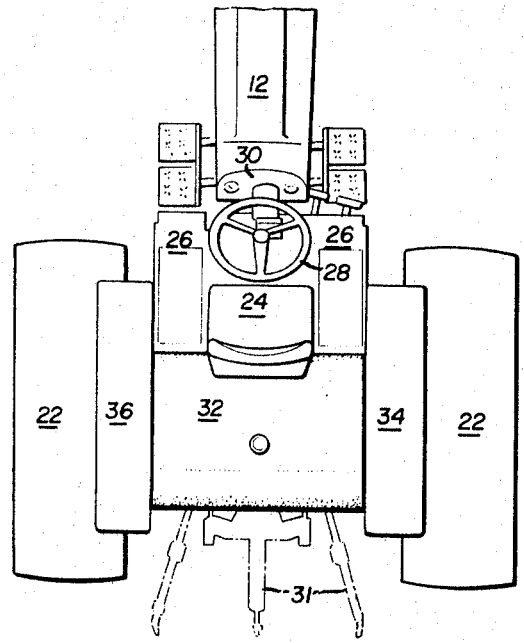
FIG. 2 is a plan view of the rear portion of the tractor shown in FIG. 1.

As seen in FIGS. 1 and 2, the tractor includes a main frame structure 10, an engine 12, and a transmission and differential unit 14 carried by means of axles 16 and 18 on wheels 20 and 22. In FIG. 1, the right rear wheel and rear fender have been omitted to show the operator's station more clearly. The operator's station generally comprises a seat 24, a platform generally designated as 26, a steering wheel 28, and instrument panel 30, and the tractor pedals and levers for controlling the direction and speed of the tractor. The pedals may include clutch and brake devices and the levers may include a throttle control and the like. Since many of the modern tractors include hitch mechanism for mounting implements thereon, additional levers and pedals are located adjacent the operator's seat for control of these implements. A three point hitch 31 is attached at the rear of the tractor for towing an implement. As seen in FIGS. 1 and 2, a fuel tank 32 is also supported from the platform rearwardly of the operator's seat. Rear wheel fenders 34 and 36 are secured by means of bolts or the like to the platform.

Of course, there are many tractors which do not include all of the above elements or items located on the platform; however, the make and model of the tractor determine the specific design of the operator's station. The platform is generally supported on the tractor frame and is secured thereto by means of bolts or the like to provide a rigid mounting for the operator.

Figure 3:
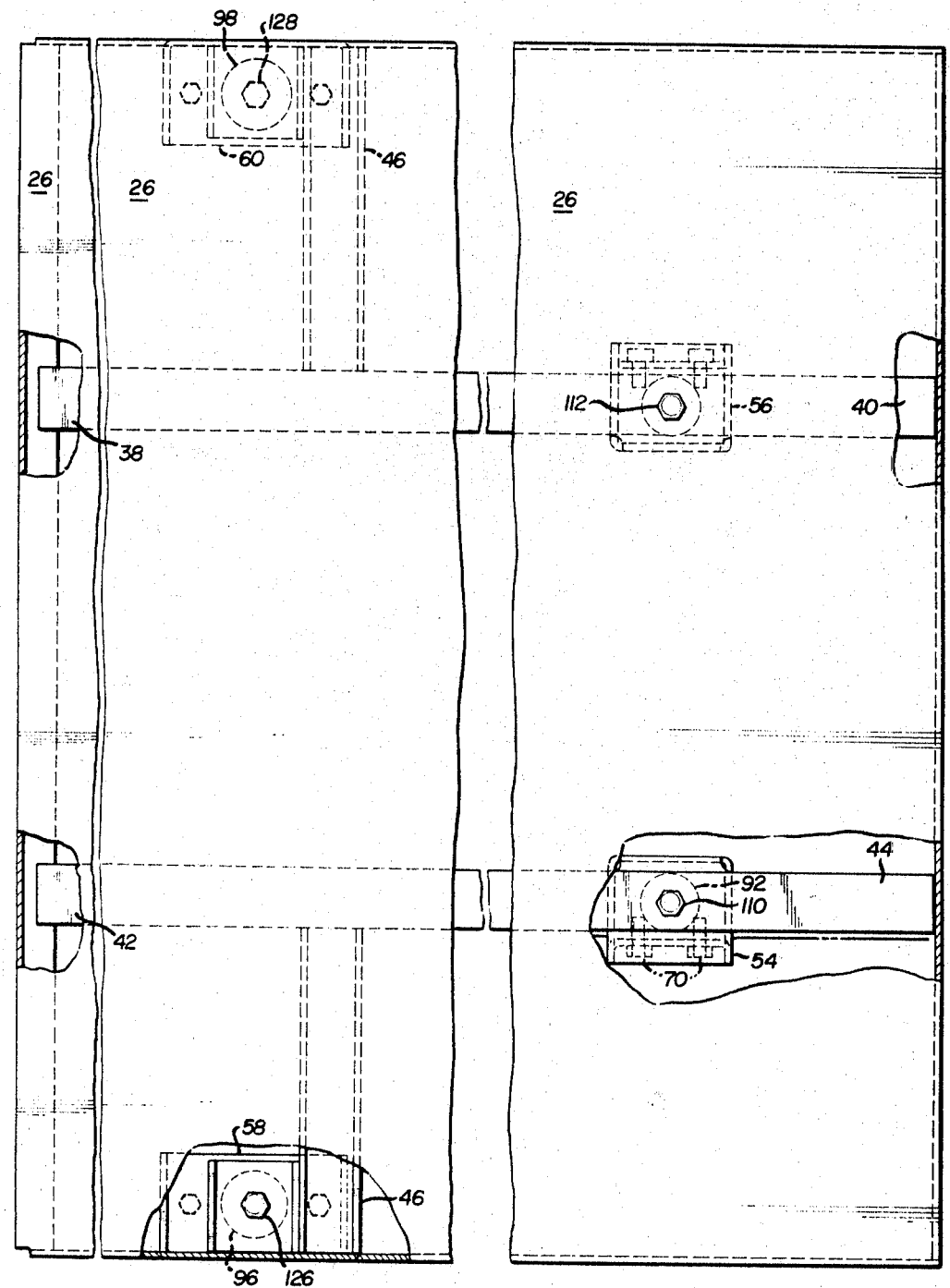
FIG. 3 is an enlarged plan view of a fragment of the platform.
Figure 4:
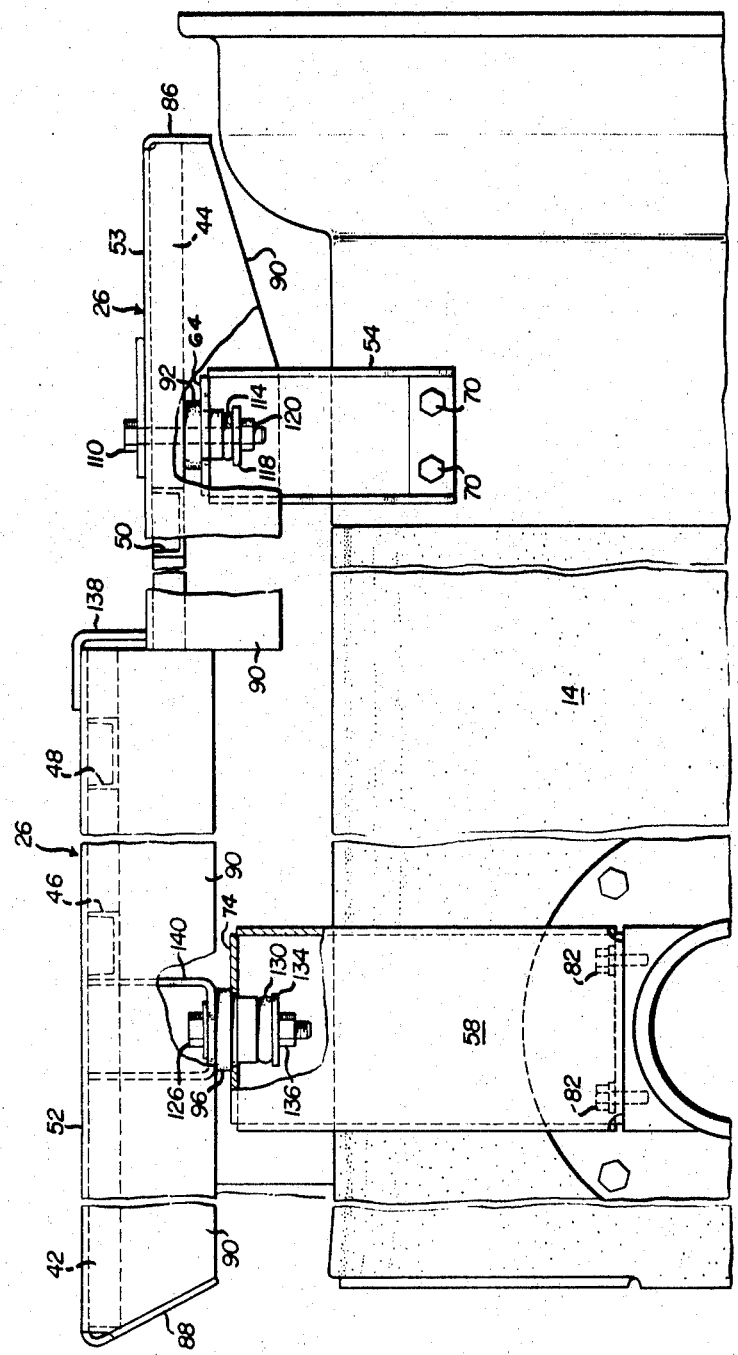
FIG. 4 is a side view of the platform shown in FIG. 3.

The present invention provides for an operator's station which includes the platform and is shown fragmentarily in detail in FIGS. 3 and 4 which show the front of the platform at the right sides of the views. The platform includes frame means comprising fore and aft extending members 38, 40, 42, and 44 and transversely extending members 46, 48, and 50. These platform frame members are shown as being channel-shaped and disposed to be interconnected as by welding. Although variations from the specific embodiment of the platform described herein may include angular or other like frame members, the platform would include a top cover or rear plate 52 and the cover or front plate 53. The covers could also be made up of a number of plates secured to the frame, depending upon the particular requirements.

Figure 5:
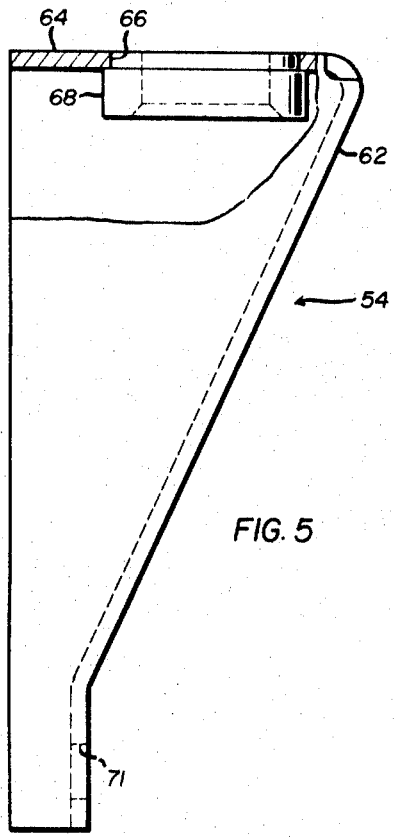
FIG. 5 is a detailed view showing the platform front supporting means.
Figure 6:
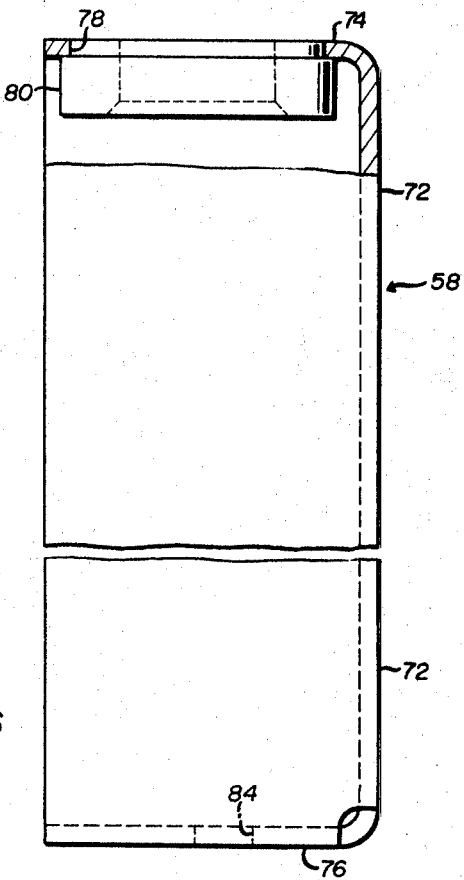
FIG. 6 is a detailed view showing the platform rear supporting means.

In the present invention, the platform 26 is supported at four points on the tractor, these points being at the front supports 54 and 56 and the rear supports 58 and 60. The front support, shown in FIGS. 4 and 5, includes an inclined channel bracket 62 with a top portion 64, the support being secured as by bolting to the transmission case. The top portion 64 includes a bore 66 and a hollow spacer 68 is fitted in the bore to receive the resilient mount. The support is secured to the tractor by means of stud bolts 70 in the bracket openings 71, seen in FIG. 4. The rear support shown in FIGS. 4 and 6 includes a channel-shaped bracket 72 secured as by bolting to the rear axle housing. The bracket has top and bottom portions 74 and 76, the top portion having a bore 78 with a hollow spacer 80 fitted to receive the resilient mount. Each of the rear supports is secured to the axle housing by means of stud bolts 82 in openings 84 in the bottom portion 76 of the bracket. These brackets provide a sturdy support for the operator's platform. The platform also includes drop front, rear, and side portions 86, 88, and 90, seen in FIG. 4, to provide strength and they are also for a pleasing appearance. The front and rear supports are, of course, secured to the tractor at a suitable height to carry the platform frame members.

Figure 7:
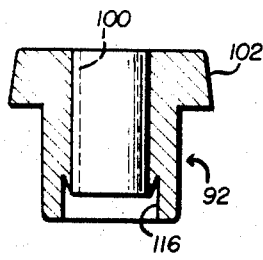
FIG. 7 is a sectional view of one of the mounts for supporting the front of the platform.
Figure 8:
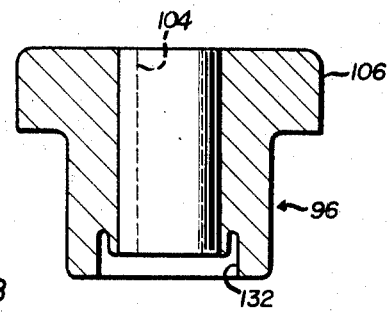
FIG. 8 is a similar view of one of the rear mounts.

As seen in FIGS. 3 and 4, platform mounts 92 and 94, one of which is shown sectionally detailed in FIG. 7, are inserted in the hollow spacers 68 in the front brackets, and the mounts extend upwardly from top portion 64. Likewise platform mounts 96 and 98, sectionally detailed in FIG. 8, are inserted in the hollow spacers 80 in the rear brackets. Mounts 92 and 94 are circular-shaped resilient elements having bores 100 and heads 102. Similarly mounts 96 and 98 are circular-shaped resilient elements having bores 104 and heads 106. Bolts 110 and 112 are inserted in bores 100, and resilient washers 114 are placed on the bolts and seated over the recesses 116 in the mounts. Flat washers 118 are then placed on the bolts against the resilient washers and nuts 120 are threaded on the bolts and are tightened sufficiently to engage the resilient washers in the recesses. Rear bolts 126 and 128 are inserted in bores 104 and resilient washers 130 are placed on these bolts and seated over the recesses 132 in the mounts. Flat washers 134 are then placed on the bolts against the resilient washers and nuts 136 are threaded on the bolts and are tightened sufficiently to engage the resilient washers in the recesses. FIG. 4 shows the rubber washers 114 and 130 radially extended to preclude upward movement of these rubber washers past their respective spacers 68 and 80, so the platform 26 is held down. The rubber mounts 92 and 96, with their recesses 116 and 132, and the rubber washers 114 and 130, form a second head on the rubber mounts 92 and 96. The foot pounds of torque applied to nuts 120 and 136 is controlled such that the resilient mounts are capable of yielding under the weight of the operator, the platform, and the various devices and mechanism thereon. The resiliency of the mounts is such that vibrations are absorbed and the operator does not feel the ill effects of long time exposure.

The resilient mounting elements are located in the specific positions so that normal engine vibration is carried to the attaching points and absorbed in the resilient washers and mounts. In the case of rough or uneven ground surfaces, when one or more of the wheels transmits the roughness to the tractor frame, one or more of the resilient mounts may be affected. Therefore, the independent relationship of the mounts is utilized in absorbing jolts or the like from uneven ground.

As stated, the platform construction depends upon the particular areas to be covered, and, in the embodiment shown, there is a rise or offset 138 intermediate the front and rear parts of the platform. A channel-shaped reinforcement or spacer 140 is secured on each side to the platform rear portion 4 and includes bores for the bolts 126 and 128. A washer is placed between the head of the bolt and the spacer, as seen in FIG. 4. The head 106 of rear mount 96 is therefore in supporting contact with the spacer 140. The head 102 of front mount 92 is in supporting contact with the frame member 44.

As was mentioned above, all of the devices and controls on the platform are isolated from the tractor frame. The operator's seat is, of course, secured to the platform and is separate from the tractor frame. The steering wheel includes means in the column for isolating the connecting parts. The firewall and instrument panel are likewise separated from the tractor frame by means of resilient supports, and the controls have linkages, cables or the like which prevent vibrations being transmitted to the operator or which vibrations and jolts are absorbed in the resilient platform mounts. The gas tank line may include a short length of resilient tubing to absorb vibration.

It is thus seen that herein shown and described is an operator's station for a vehicle which includes a platform resiliently supported and isolated from the vehicle frame, which carries all the devices and mechanism with which the operator may come in contact, and which station is unitarily removable from the tractor. The removal is accomplished by disconnecting the lines, linkages and the like of the various controls and by removing the four bolts in the resilient mounts. The invention provides for all of the features and advantages as set out above and greatly improves operator comfort.

What is claimed as new and desired to be secured by Letters Patent of the United States is:

1. In a tractor having a frame and a resiliently mounted platform for insulating the tractor operating vibrations of said frame from said platform, the improvement comprising a plurality of spaced-apart brackets fixedly mounted relative to said frame and with each of said brackets having axially uprightly disposed rubber mount openings and horizontally disposed upper and lower surfaces surrounding each of said bracket openings, a rubber mounting and bolt assembly disposed in each of said bracket openings and including spaced-apart rubber portions presenting heads overlying said upper and lower surfaces and flanking the thickness of said platform for insulating vibrations from said brackets to said platform.

2. In a tractor having a frame and a resiliently mounted platform for insulating the tractor operating vibrations of said frame from said platform, the improvement comprising a plurality of spaced-apart brackets fixedly mounted relative to said frame and with each of said brackets having axially uprightly disposed rubber mount openings and horizontally disposed surfaces surrounding the upper ends of each of said openings, rubber mounts disposed in each of said bracket openings and with each of said rubber mounts having a head portion extending radially into overlying contact with each of said surfaces, said platform being disposed in overlying contact with the upper ends of said rubber mounts to be upwardly supported thereon for insulating vibrations from said brackets to said platform, said rubber mounts and said platform both having openings extending therethrough in axial alignment with each other and co-axial with said mount openings in said brackets, a bolt disposed in each of said axially aligned openings in said platform and said rubber mounts and with each of said bolts including a head disposed above a respective portion of said platform for holding said platform down against said head portions of said rubber mounts, a nut on the end of each of said bolts opposite said bolt head for tightening said bolts against said platform portions, and a rubber washer on each of said bolts and interposed between said nuts and said brackets for insulating vibration from said brackets to said platform.

3. The subject matter of claim 2, including a spacer disposed in each of said bracket openings and having an elongated hole snugly receiving said rubber mounts in said bracket openings, each of said rubber washers being disposed adjacent one axial end of said hole of said spacer and being of a size sufficient to overlie said axial end of said spacer at least when said bolt is tightened.

4. The subject matter of claim 2, wherein each of said rubber mounts has a counterbore adjacent said nut, and said rubber washer is seated over said counterbore when said bolt is tightened.

References Cited

UNITED STATES PATENTS

| 2,769,656 | 11/1956 | Lee | 296—35 |
| 2,838,339 | 6/1958 | Schaldenbrand | 296—35 |
| 3,352,598 | 11/1967 | Anderson | 296—35 |
| 3,380,773 | 4/1968 | Sewelin | 180—89 |

KENNETH H. BETTS, *Primary Examiner.*

L. DANIEL MORRIS, JR., *Assistant Examiner.*

U.S. Cl. X.R.

180—89